US010922264B1

United States Patent
Adamson et al.

(10) Patent No.: US 10,922,264 B1
(45) Date of Patent: Feb. 16, 2021

(54) CAN TRANSCEIVER

(71) Applicant: NXP B.V., Eindhoven (NL)

(72) Inventors: Anthony Adamson, Nijmegen (NL); Georg Olma, Grasbrunn (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/781,939

(22) Filed: Feb. 4, 2020

(51) Int. Cl.
- G06F 13/42 (2006.01)
- H04B 1/38 (2015.01)
- H04L 12/40 (2006.01)

(52) U.S. Cl.
CPC ........... *G06F 13/4282* (2013.01); *H04B 1/38* (2013.01); *H04L 12/40013* (2013.01); *G06F 2213/40* (2013.01)

(58) Field of Classification Search
CPC ... G06F 13/4282; G06F 2213/40; H04B 1/38; H04B 12/40013
See application file for complete search history.

(56) References Cited

U.S. PATENT DOCUMENTS

| | | | | |
|---|---|---|---|---|
| 5,283,904 A | * | 2/1994 | Carson | G06F 15/17 710/266 |
| 5,347,638 A | * | 9/1994 | Desai | G06F 9/24 710/5 |
| 6,243,778 B1 | * | 6/2001 | Fung | H04L 12/40117 370/462 |
| 2010/0260102 A1 | * | 10/2010 | Liu | H04L 1/1848 370/328 |
| 2016/0149934 A1 | * | 5/2016 | Frank | H04L 12/40169 726/23 |

OTHER PUBLICATIONS

Elend, B. et al. "Cyber security enhancing CAN transceivers", iCC 2017, CAN in Automation, 4 pgs., retrieved from the internet Jan. 27, 2020 at: https://www.can-cia.org/fileadmin/resources/documents/conferences/2017_elend.pdf (2017).

* cited by examiner

Primary Examiner — Henry Tsai
Assistant Examiner — John B Roche
(74) Attorney, Agent, or Firm — Rajeev Madnawat

(57) ABSTRACT

A transceiver for sending and receiving data from a controller area network (CAN) bus I disclosed. The transceiver is configured to detect if a node, after losing an arbitration, has sent a dominant bit on the CAN bus. The transceiver further configured to send a predefined bit pattern on the CAN bus after receiving the dominant bit from the node.

19 Claims, 2 Drawing Sheets

CAN TRANSCEIVER

BACKGROUND

A Controller Area Network (CAN bus) is a vehicle bus standard designed to allow microcontrollers and devices to communicate with each other's applications without a host computer. CAN is a message-based protocol that uses two wires to enable multiple devices to communicate with each other and is used in many type of applications including automotive applications. For each message, the data in a packet is transmitted sequentially but in such a way that if more than one device transmits messages at the same time, only the highest priority message is able to continue while other devices stop transmitting their message. This process, known as "arbitration", is used by all sending devices and the device that attempts to send the highest priority message wins the arbitration. Transmitted packets are received by all devices, including by the transmitting device receiving its own message. However, a spurious device may attempt to hijack the bus control even after losing the arbitration.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a transceiver for sending and receiving data from a controller area network (CAN) bus I disclosed. The transceiver is configured to detect if a node, after losing an arbitration, has sent a dominant bit on the CAN bus. The transceiver further configured to send a predefined bit pattern on the CAN bus after receiving the dominant bit from the node. In some examples, the predefined bit pattern may include a CAN Error Frame.

In another embodiment, a method for preventing a node from interrupting a transmission on a controller area network (CAN) bus is disclosed. The method includes detecting if the node has lost an arbitration and a remote node is transmitting, detecting if the node transmits a dominant bit onto the CAN bus after the node has lost the arbitration and before the end of current frame transmission by a remote node and sending a complete Error Frame on the CAN bus.

In some examples, the transceiver is configured to send the predefined bit pattern to the CAN bus in response to a bit counter reaching a predefined number of bits. The transceiver may further include a bit decoder to process data bits sent by the node to the CAN bus after the node has lost arbitration. The transceiver may also be configured to send the predefined bit pattern to the CAN bus in response to detecting a predefined received bit pattern from the node.

In some examples, the transceiver is further configured to disable the node for a preselected period of time after sending the complete Error Frame. The transceiver may be configured to store a white list of message identifiers and may be configured to detect if the node has won the arbitration and check, through the white list, if the node is permitted to send a message identifier being sent by the node, and if the node is not permitted to send the message identifier, ignoring the message identifier and setting a recessive bit on the CAN bus. In some embodiments, the transceiver may also be configured to store a black list of message identifiers to detect, In some embodiments, the transceiver may include a counter to count data bits sent by the node to the CAN bus after the node has lost the arbitration and an Error Frame generator configured to create a CAN Error Frame after detecting that the node has lost the arbitration and has sent a dominant bit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Figure 1:
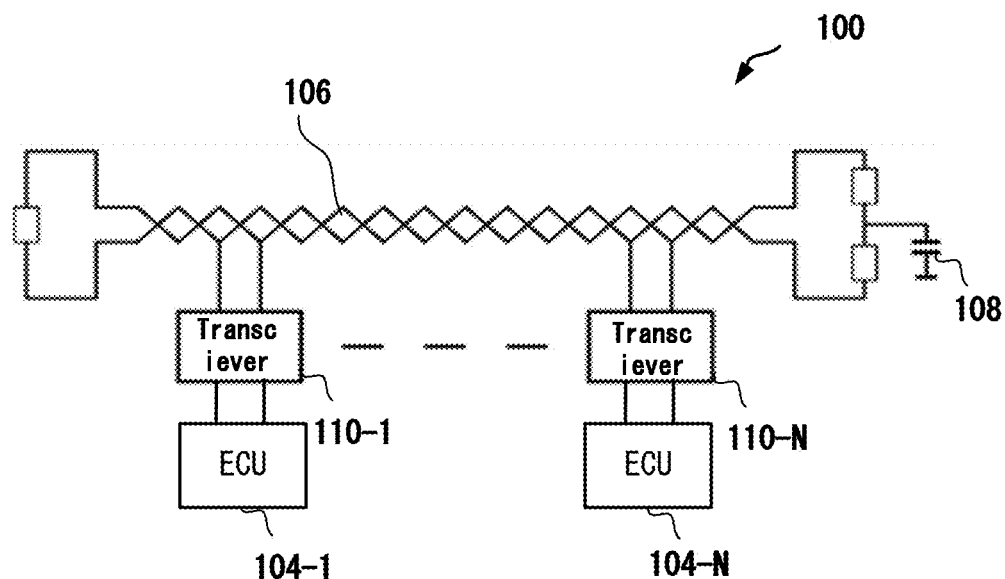
FIG. 1 depicts a controller area network (CAN) bus with a terminating end resistor and capacitor.

Note that figures are not drawn to scale. Not all components of the transceiver are shown. The omitted components are known to a person skilled in the art.

DETAILED DESCRIPTION

Many well-known manufacturing steps, components, and connectors have been omitted or not described in details in the description so as not to obfuscate the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", "one example", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Controller Area Network (CAN) is a peer-to-peer network. Meaning that there is no master that controls when individual nodes have access to read and write data on the CAN bus. When a CAN node is ready to transmit data, it checks to see if the CAN bus is free and then simply writes a CAN frame onto the network. The CAN frames that are transmitted do not contain addresses of either the transmitting node or any of the intended receiving node(s). Instead, an arbitration ID that is unique throughout the network is contained in a data frame. All nodes on the CAN network receive the CAN frame, and, depending on the message or arbitration identifier of that transmitted frame, each CAN node on the network decides whether to accept the frame for further processing.

If multiple nodes try to transmit messages onto the CAN bus at the same time, the node with the highest priority (lowest value of message or arbitration identifier) gets bus access. Lower-priority nodes (or messages) must wait until the bus becomes available before trying to transmit again.

CAN nodes (e.g., ECUs) use transceivers to interface with the CAN bus. The transceivers include an Rx port and a Tx port to enable communication with other CAN nodes through the CAN bus. Transceivers normally provide a simple interface for mode control from a device/microcontroller in a network. A typical standard transceiver makes use of up to two dedicated mode control pins, and this means that there are usually not more than four different states of operation.

The CAN protocol specifies the structure of a CAN frame. The CAN frame includes (in this order):
1. SOF (start-of-frame) bit—indicates the beginning of a message with a dominant (logic 0) bit.
2. Message or Arbitration ID—identifies the message and indicates the message's priority. Frames come in two formats—standard, which uses an 11-bit arbitration ID, and extended, which uses a 29-bit arbitration ID.
3. IDE (identifier extension) bit—allows differentiation between standard and extended frames.
4. RTR (remote transmission request) bit—serves to differentiate a remote frame from a data frame. A dominant (logic 0) RTR bit indicates a data frame. A recessive (logic 1) RTR bit indicates a remote frame.
5. DLC (data length code)—indicates the number of bytes the data field contains.
6. Data Field—contains 0 to 8 bytes of data.
7. CRC (cyclic redundancy check)—contains 15-bit cyclic redundancy check code and a recessive delimiter bit. The CRC field is used for error detection.
8. ACK (ACKnowledgement) slot—any CAN controller that correctly receives the message sends an ACK bit at the end of the message. The transmitting node checks for the presence of the ACK bit on the bus and reattempts transmission if no acknowledge is detected.
9. CAN Signal—an individual piece of data contained within the CAN frame data field. You also can refer to CAN signals as channels. Because the data field can contain up to 8 bytes of data.

FIG. 1 depicts a controller area network (CAN) bus 100. The CAN bus 100 includes terminating end resistors to suppress wave reflections. In some embodiments, a capacitor 108 may also be used at a terminating end. The CAN bus 100 includes a twisted wire pair 106. The twisted wire pair 106 includes CANH and CANL wires. The CAN bus 100 may include a plurality of communication microcontrollers or electronic control units (ECUs) 104-1 . . . 104-N coupled with the twisted wire pair through a plurality of transceivers 110-1 . . . 110-N. The capacitor 108 is typically 4.7 nF. The value of the capacitor 108 may be increased to approximately 100 nF. By increasing the value of the capacitor 108, a signal voltage at CANL or CANH during intermittent opens is improved. The resistors coupled with the capacitor 108 are typically 60 ohm each (total 120 ohm at each end).

As shown, the communication nodes (ECUs) 104-1 . . . 104-N are connected via an unshielded twisted pair 106. Termination is implemented at the far left- and right-hand side of the CAN bus 100. There are two options, either by using a single resistor as shown in the left-hand side of the CAN bus 100, or via two resistors and the capacitor 108, referred to as "split-termination" as shown on the right-hand side of the CAN bus 100. The latter method is commonly used as it offers an additional low-pass filtering to improve EMC performance.

Figure 2:
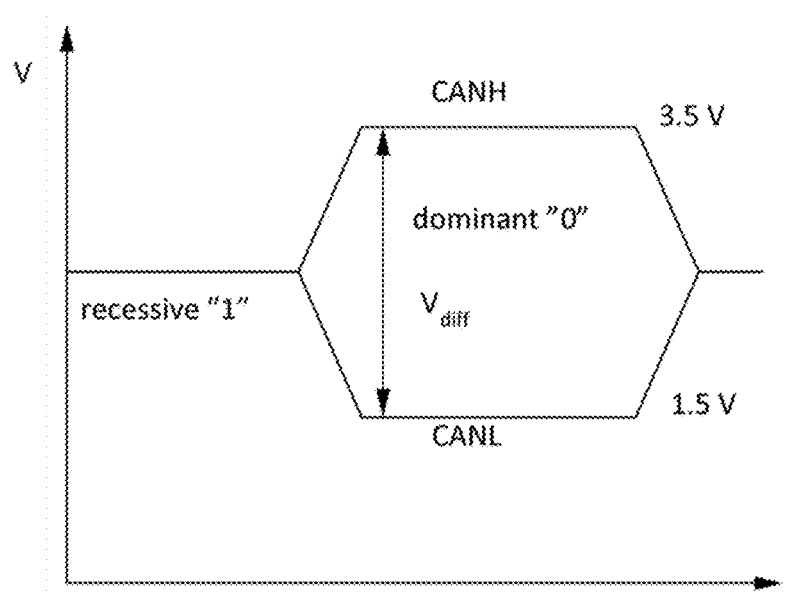
FIG. 2 depicts CAN bus communication protocol showing a representation of "0" and "1" based on a differential voltage at CANH and CANL.

As shown in FIG. 2, in normal operations (when no errors are present), the CAN bus 100 signals CANH and CANL are driven such that a differential voltage is generated (to send a dominant signal) or no differential signal is generated (to send a recessive bit). In some implementations, for a dominant bit ("0") the voltage at CANL is approximately 1.5V and the voltage at CANH is 3.5V and Vdiff represents a difference between the voltages at CANH and CANL. In some examples, Vdiff>0.9V may be considered a dominant bit and Vdiff<0.5 may be considered a recessive bit.

The communication nodes (e.g., ECUs 104-1 . . . 104-N) on the CAN bus 100 that wish to send data on the CAN bus send a dominant SOF bit when the CAN bus 100 is idle (e.g., in the recessive state for a duration) to indicate that the nodes would like to send a data frame. Next, each node sends a message identifier. Note that the nodes are configured such that no two nodes can send a data frame including the same message identifier. The CAN protocol provides an 11-bit message identifier. In another version of the CAN protocol, the message identifier is specified to include 29 bits. The relative priority of a message identifier is characterized by the value of the message identifier. A lower value message identifier has a higher priority. For example, the message identifier with the value 11001000111 (0x647) will have a higher priority than the message identifier with the value 11011111111 (0x6FF).

If the ECU 104-1 and the ECU 104-N simultaneously send SOF bit and then start transmitting the message identifiers 11001000111 and 11011111111 respectively, on the fourth bit, the ECU 104-1 will win the arbitration because it will send a dominant bit, which will overwrite the recessive bit sent by the ECU 104-N. The ECU 104-1 will read a dominant bit after sending a dominant bit on the CAN bus 100 and will continue to send further data bits whereas the ECU 104-N will read a dominant bit after having sent a recessive bit (e.g., the forth most significant bit in the above message identifier example) and will assume that it has lost the arbitration and will stop sending further data bits on the CAN bus 100, and will wait for the CAN bus 100 to be free again before attempting to send the message, at which time, the process of arbitration will start again.

However, the above described process can only work if the ECU 104-N honors the CAN protocol. If the ECU 104-N is a malicious component that is maliciously programmed to interrupt the data transmission on the CAN bus 100, the ECU 104-N, after having lost the arbitration, may still flip a later bit sent by the ECU 104-1 on the CAN bus 100. This can be done in the data phase (e.g. during the transmission of Data Field) of the CAN frame transmission to replace valid data being sent with malicious data. For example, when the ECU 104-N detects that the ECU 104-1 has sent a recessive bit, the ECU 104-N may send a dominant bit on the CAN bus 100 to overwrite the recessive bit sent by the ECU 104-1. Because a dominant bit overwrites a recessive bit on the CAN bus 100, the data being sent by the ECU 104-1 will no longer be a valid data. The ECU 104-N may continue to repeat this malicious action to cause a failure of data communication on the CAN bus 100. This failure may create a dangerous condition, for example, for a user of a vehicle. Suppose the ECU 104-1 was transmitting anti-lock braking data when the vehicle was skidding on an icy road, the failure of communication caused by malicious actions of the ECU 104-N may pose a serious risk of harm.

Assuming again that the ECU 104-N is a malicious ECU, the ECU 104-N may continue to send high priority messages to virtually hijack the CAN bus 100 by prohibiting other ECUs (e.g., the ECU 104-1) from sending data on the CAN bus 100.

Figure 3:
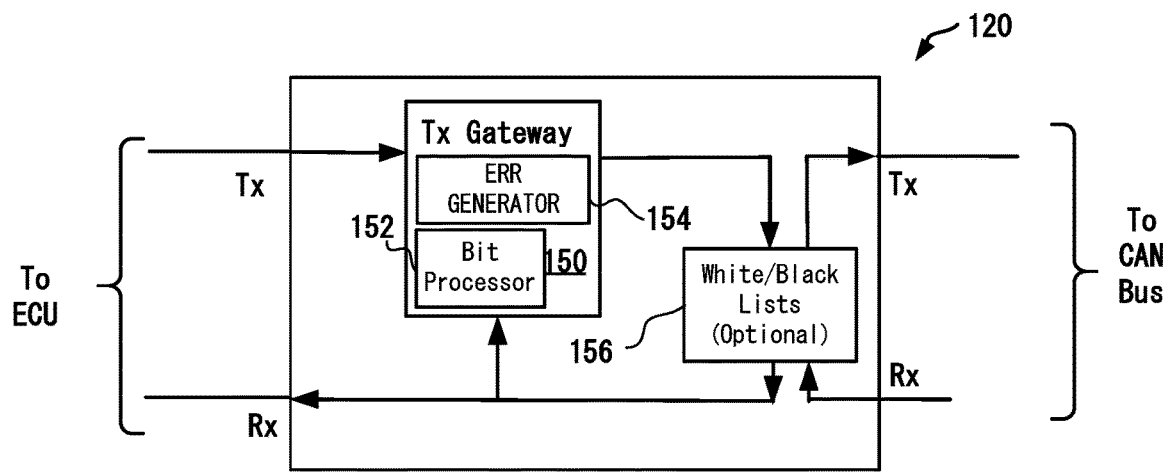
FIG. 3 shows a schematic of a transceiver in accordance with one or more embodiments of the present disclosure.

FIG. 3 shows a transceiver 120. Note that many components of the transceiver 120 have been omitted so as not to obfuscate the present disclosure. The transceiver 120 may replace the transceiver 110-N in FIG. 1 (and of course any other transceiver on the CAN bus 100) to make the CAN bus 100 shown in FIG. 1 a secure CAN bus. With the transceiver 120 monitoring the ECU 104-N, the ECU 104-N will no longer be able to maliciously interrupt the data communication on the CAN bus 100.

The transceiver 120 includes a transmit (tx) gateway 150. In some embodiments, the transceiver 120 may also optionally include a white/black list module 156 that provides storage and verification of the message identifiers that are allowed to pass through the transceiver 120 over to the CAN bus 100. The message identifiers stored in the white list module 156 may be configured when the transceiver 120 is provisioned for the use. Prior to sending a message identifier to the CAN bus 100, the transceiver 120 checks if the message identifier being checked is allowed to be sent to the CAN bus 100 by the ECU 104-N. If the white/black list module 156 does not include the message identifier in the white list (or if the message identifier is included in the blacklist), the white/black list module 156 will reject the message. If the ECU 104-N, for example, is not supposed to receive and accept a certain message identifier, the white/black list module 156 will not deliver those messages to the ECU 104-N. The white/black list module 156 is configured such that the ECU 104-N cannot alter the list stored in the white/black list module 156.

The tx gateway 150 includes a bit processor 152 and an error generator 154. The tx gateway 150 monitors if the ECU 104-N has won or lost arbitration. The white/black list module 156 may process or filter the data prior to or after the tx gateway has finished processing. If the tx gateway 150 determines that the ECU 104-N has lost the arbitration and yet attempt to send a dominant bit, the bit processor 152 starts counting the number bits being sent. In some examples, the counting may include check the width of the dominant bit sent by the ECU 104-N. If the ECU 104-N continues to send more bits, the ECU 104-N may be sending a legitimate Error Frame (6-bit long or more) and such messages are allowed to go to the CAN bus 100. However, if the ECU 104-N stops sending more dominant bits, the tx gateway will send the remaining bits to indicate an error condition. If the ECU 104-N sends more than one Error Frames within a preselected time interval, the tx gateway 150 may disable the ECU 104-N for a preselected time period to prevent the ECU 104-N from staging a denial of service attack. In one example, upon receiving the dominant bit, other ECUs may believe that the ECU 104-N has the control of the CAN bus 100 and then the malicious ECU 104-N may send a complete CAN frame with a valid CRC to highjack the CAN bus 100. In another example, because the dominant bit sent by the ECU 104-N will overwrite the recessive bit sent by the ECU 104-1, the CAN frame sent by the ECU 104-1 will be corrupted. The transceiver 120 will prevent the malicious ECU 104-N from either corrupting the data sent by the ECU 104-1 or will prevent the malicious ECU 104-N from hijacking the CAN bus 100 after losing the arbitration. Note that the term "ECU" is being used for example only. The term "ECU" means any device (e.g., a microcontroller) that uses the CAN bus 100.

In some examples, if the dominant pulse is less than 6-bits, the transceiver 120 is configured to extend the dominant pulse on the CAN bus 100 to a longer amount, e.g., 6 or 11 dominant bits.

If the ECU 104-N stops sending further bits after sending a dominant bit, after losing the arbitration, the error generator 154 will continue to send more bits, total six (or more depending on the implementation), to send a legitimate Error Frame on the CAN bus 100. The tx gateway 150 may then disable the data transmission of the ECU 104-N for a preselected period (e.g., a few seconds) to prevent the ECU 104-N from staging a data interruption attack on the CAN bus 100. The tx gateway 150 may be implemented in hardware or software. In some embodiments, the error generator may be implemented in the bit processor 152. In some examples, the bit processor 152 may include a CAN protocol controller.

Figure 4:
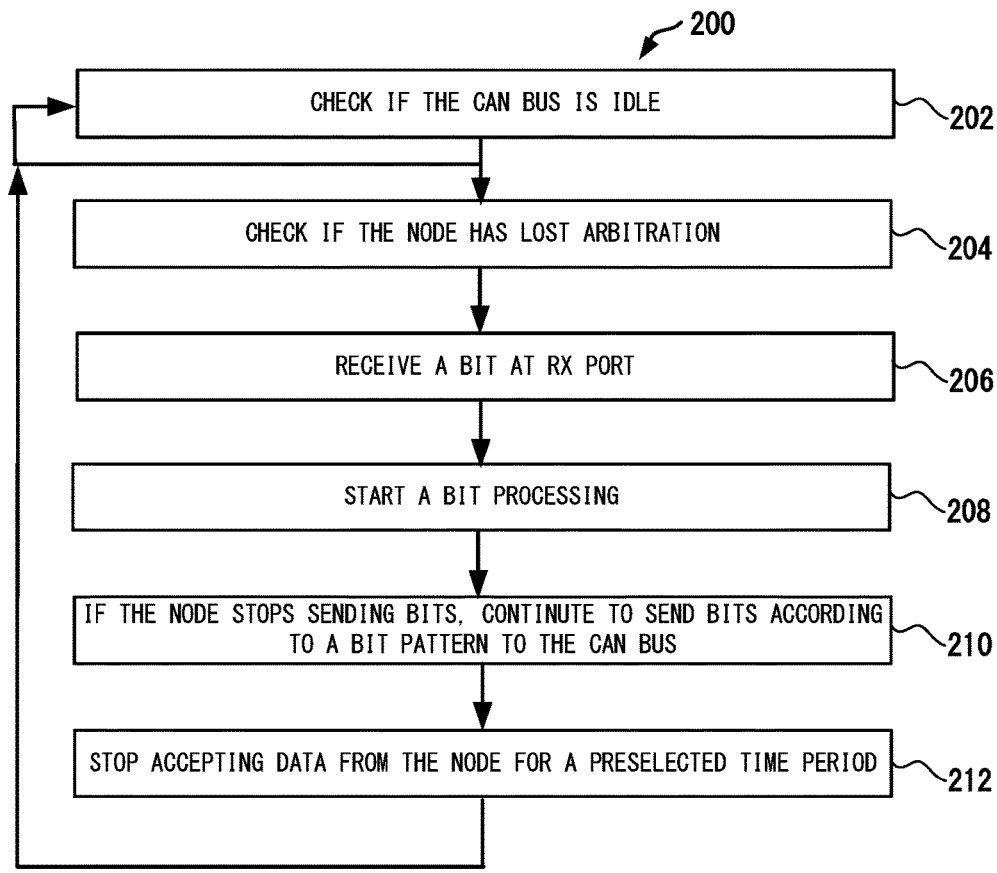
FIG. 4 illustrates a flow diagram to CAN data transmission in accordance with one or more embodiments of the present disclosure.

FIG. 4 shows a flow diagram 200 for securing the CAN bus 100 by the transceiver 120. Accordingly, at step 202, as per the CAN protocol, prior to sending the data on the CAN bus 100, the ECU 104-N (for example), through the transceiver 120 checks if the CAN bus is idle. At step 204, the transceiver 120 checks if the ECU 104-N has won or lost the arbitration. If the ECU 104-N has won the arbitration and attempt to send a message identifier that the ECU 104-N is not allowed to send, the transceiver 120 stops the transmission of the rest of the CAN frame originating from the ECU 104-N and sets a recessive bit on the CAN bus 100 to allow other ECUs to attempt to use the CAN bus 100. In some embodiments, the transceiver 120 may disable sending any further messages by the ECU 104-N for a preselected time period.

If the ECU 104-N has lost the arbitration, at step 206, upon detecting that another node that had won the arbitration, has sent a bit to the CAN bus 100, the ECU 104-N sends a dominant bit that is detected by the transceiver 120. At step 208, through the bit processor 152, the transceiver 120 monitors if the ECU 104-N is attempting to send a legitimate Error Frame (6-bits length or more). If so, the transceiver 120 allows the Error Frame to go through. However, if the ECU 104-N sends a predetermined and configurable number of Error Frames consecutively within a preselected and configurable time period, the transceiver 120 may disable the transmission of messages from the ECU 104-N for a preselected and configurable period of time. Also, if the transceiver 120 detects that the ECU 104-N stopped sending a full Error Frame, at step 210, the transceiver 120 generates the remaining bits to send a valid Error Frame on the CAN bus 100. In some example, the bit processor 152 or the error generator 154 may generate a predefined bit pattern based on a bit pattern received from the ECU 104-N. Subsequently, at step 212, the transceiver 120 stops accepting any further data from the ECU 104-N for a configurable preselected period of time.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A transceiver for sending and receiving data from a controller area network (CAN) bus, wherein the transceiver is configured to detect if a node associated with the transceiver, after losing an arbitration, has sent a non error message to the transceiver, wherein the transceiver is further configured to send a predefined bit pattern on the CAN bus after receiving the non error message from the node.

2. The transceiver of claim 1, further configured to disable the node for a preselected period of time after sending the predefined bit pattern.

3. The transceiver of claim 1, wherein the predefined bit pattern includes a CAN Error Frame.

4. The transceiver of claim 1, further configured to store a white list of message identifiers.

5. The transceiver of claim 4, further configured to detect if the node has won the arbitration and check, through the white list, if the node is permitted to send a message identifier being sent by the node, and if the node is not permitted to send the message identifier, ignoring the message identifier and setting a recessive bit on the CAN bus.

6. The transceiver of claim 1, further configured to store a black list of message identifiers.

7. The transceiver of claim 6, further configured to detect, through the black list, if another node, which won the arbitration, is non-legitimately using a message identifier which is part of the black list.

8. The transceiver of claim 1, further including a counter to count data bits sent by the node to the CAN bus after the node has lost the arbitration.

9. The transceiver of claim 8, further configured to send the predefined bit pattern to the CAN bus in response to the counter reaching a predefined number of bits.

10. The transceiver of claim 1, further including a bit decoder to process data bits sent by the node to the CAN bus after the node has lost arbitration.

11. The transceiver of claim 10, further configured to send the predefined bit pattern to the CAN bus in response to detecting a predefined received bit pattern from the node.

12. The transceiver of claim 1, further including an Error Frame generator configured to create a CAN Error Frame after detecting that the node has lost the arbitration and has sent a dominant bit.

13. A method for preventing a node including a transceiver from interrupting a communication on a controller area network (CAN) bus, the method comprising:
 detecting if the node has lost an arbitration;
 receiving, by the transceiver associated with the node, a non error message from the node after the node has lost the arbitration;

sending, by the transceiver associated with the node, a complete Error Frame on the CAN bus after receiving the non error message from the node that has lost the arbitration.

14. The method of claim 13, further including disabling the node for a preselected period of time after sending the complete Error Frame.

15. The method of claim 13, further including storing a white list of message identifiers.

16. The method of claim 15, further including detecting if the node has won the arbitration and check, through the white list, if the node is permitted to send a message identifier being sent by the node, and if the node is not permitted to send the message identifier, ignoring the message identifier and setting a recessive bit on the CAN bus.

17. The method of claim 13, further including storing a black list of message identifiers.

18. The method of claim 17, further includes detecting, through the black list, if the node is permitted to receive a message identifier from the CAN bus.

19. A transceiver for sending and receiving data from a controller area network (CAN) bus, wherein the transceiver is configured to detect if a node, after losing an arbitration, has sent a dominant bit on the CAN bus, wherein the transceiver is further configured to send a predefined bit pattern on the CAN bus after receiving the dominant bit from the node and prohibiting the node for a predetermined period from sending data on the CAN bus.

* * * * *